United States Patent [19]
Gutermuth et al.

[11] 4,069,282
[45] Jan. 17, 1978

[54] PROCESS FOR THE UNINTERRUPTED MANUFACTURE OF PLASTIC FILM TUBING

[75] Inventors: Hermann Gutermuth, Linz; Gerd Hebel, Berlin, both of Germany

[73] Assignee: Firma Kohlensaeure-Werke Rudolf Buse Sohn, Bad Hoenningen, Germany

[21] Appl. No.: 658,924

[22] Filed: Feb. 18, 1976

[30] Foreign Application Priority Data

Feb. 19, 1975 Germany .............................. 2507070

[51] Int. Cl.[2] ............................................. B29F 3/08
[52] U.S. Cl. ........................................ 264/28; 264/89;
264/95; 264/209; 264/237; 264/348; 425/72 R; 425/326.1
[58] Field of Search ...................... 264/28, 95, 89, 209, 264/237, 348, 94, 98, 99; 425/71, 72, 326 R, 387 R

[56] References Cited
U.S. PATENT DOCUMENTS

| | | |
|---|---|---|
| 2,844,846 | 7/1958 | Kronholm ........................ 425/326 R |
| 3,065,501 | 11/1962 | Gasmire ................................. 264/98 |
| 3,088,167 | 5/1963 | Corbett ........................... 425/326 R |
| 3,127,458 | 3/1964 | Scott, Jr. et al. ..................... 264/237 |
| 3,450,805 | 6/1969 | Chesser ................................. 264/98 |
| 3,576,929 | 4/1971 | Turner et al. .......................... 425/71 |
| 3,666,849 | 5/1972 | Williams et al. ....................... 264/98 |
| 3,749,540 | 7/1973 | Upmeier ........................... 425/326 R |
| 3,933,958 | 1/1976 | Hinrichs ............................... 264/209 |

FOREIGN PATENT DOCUMENTS 1,123,318   8/1968   United Kingdom .................. 264/95

*Primary Examiner*—Jeffery R. Thurlow

[57] ABSTRACT

A process for the uninterrupted manufacture of plastic film tubing by the blowing up of a continuous film tubing by means of an extruder-injector, including an inner cooling of the extruded film tubing using a gaseous cooling means initially in a liquified condition introduced inside the film tubing. The cooling medium is converted into its vaporous or gaseous condition through evaporation before being purged. The cooling medium is introduced inside the film tubing in its liquified state in such a manner that up to a reversing point located above the nozzle tip of the device, an upward coolant stream occurs in the center of the inner space of the tubing, from which stream liquid and/or solid coolant particles are carried and kept in suspension. At the reversing point the coolant stream fans out radially after which the cooling medium falls back down in an opposite direction along the wall of the film tubing toward the coolant outlet. The reversing point is made sufficiently high so that the liquid and/or solid coolant particles carried by the stream can evaporate before the coolant medium reaches an area of the film tubing which lies below the frost line in the tubing so that such an area only comes in contact with the vaporous and/or gaseous falling coolant stream.

3 Claims, 3 Drawing Figures

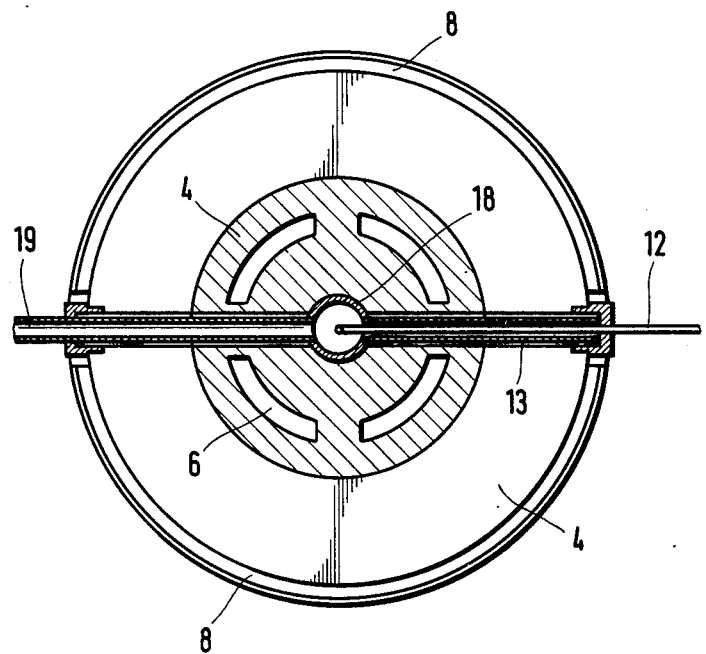
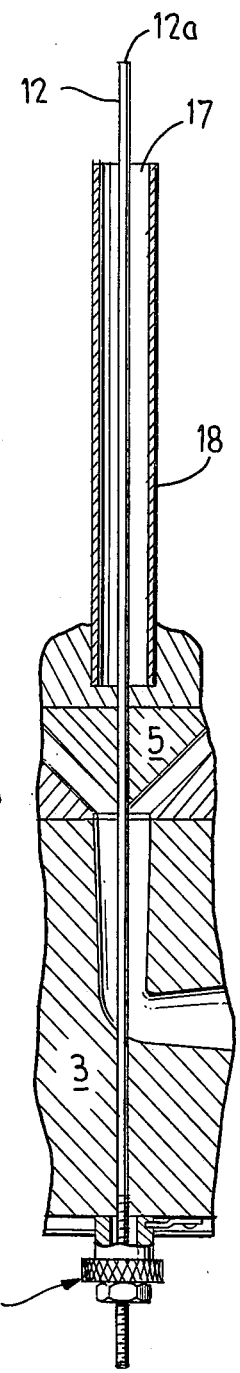

PROCESS FOR THE UNINTERRUPTED MANUFACTURE OF PLASTIC FILM TUBING

BACKGROUND OF THE INVENTION

This invention relates generally to a process and device for the uninterrupted manufacture of plastic film tubing by blowing up a continuous film tubing by means of an extruder-injector.

Since, with most existing film-blowing devices, the film tubing is extruded vertically upward through an extrusion aperture of the nozzle tip and blowing head, the following disclosure will contain references to "upward" and "downward," etc., for purposes of simplification. It is, however, also possible to have the film tubing extruded vertically downward or to the side, in which case the invention can also be used. Thus, in reference to the invention, "over, above, upward, rising," etc., generally indicate "in the direction of the extrusion, in front of the nozzle tip, flowing", etc., and "under, below, dropping", etc., generally mean "against the direction of the extrusion, behind the nozzle tip, flowing," etc. As with most known film-blowing processes, the film tubing which is extruded vertically upward through the ring-shaped extrusion aperture of the nozzle tip and blowing head, and which is still hot and flexible, is formed by blowing using an inflating medium such as air, for example, which is introduced inside the film tubing by means of the nozzle tip and blowing head. The film tubing then dries instantly. The cooled finished film tubing is pulled up by crushing cylinders and take-up rolls mounted above the nozzle tip, and compressed. The inside of the film tubing is thus sealed below by the nozzle tip and blowing head, and above by the crushing cylinders, so that excess pressure can be generated inside the tubing by the blowing medium introduced. The area between the moldable section of the film tubing below and the solidified section of the tubing above, once the cooled plastic solidifies, is referred to as the freezing zone or frost line. The film tubing section which lies between the nozzle tip and the frost line is referred to as the tube forming zone or expanding zone. In this zone, the plastic film tubing which is still hot is expanded radially and/or stretched axially by the pressure of the blowing medium and/or through the traction speed of the pick-up rolls which is higher than the speed of extrusion of the extrusion aperture, whereby the wall thickness of the extruded film tubing decreases and the desired wall thickness and diameter of the film tubing is thus obtained. The plastic film tubing, here, is supported from the inside through the pressure of the inflating medium, and from the outside through the air pressure which is blown from a ring nozzle surrounding the film tubing and serves both as a bearing pressure and as a cooling medium for the film tubing.

The performance of such a film-blowing device is not limited so much by the performance of the extruder whose speed of extrusion can always be increased, but rather primarily by the cooling power of the cooling device, since during the time it takes for the film tubing to be blown or inflated to the desired thickness, etc., cooling of the plastic at frost line temperature must occur so that further expansion or stretching of the film tubing is prevented by solidification. A reduced inflation time through faster inflation of the film tubing to increase the production capacity of the inflating device can therefore only be obtained if the cooling time can also be reduced correspondingly through improved cooling power. Particularly for the manufacture of relatively thick-walled film tubing such as that used in the manufacture of sacks or containers, for example, it has been attempted to also use an additional inner cooling system inside the extruded film tubing in view of the relatively low heat conductivity of the plastic as compared to the cooled air used for the cooling process which has been previously mentioned.

With one known method used for the inner cooling, the gaseous inflation medium used to blow up the film tubing, such as air for example, is constantly replaced by a continuous flow of carburated fuel. For this, the fuel intake has already been mounted above the nozzle tip at a certain distance from the extrusion aperture, with the fuel outlet disposed at a level with the extrusion aperture, so that the gaseous medium which serves as the cooling and inflating medium flows downward against the direction of the film tubing which is pulled upward. This should permit the carburated fuel to come in contact only with the film which is already partly cooled, and not with the film which is still hot, so as to prevent sudden chilling of the hot film since this would lead to irregular cooling of the tubing wall and thereby result in a poor quality product with uneven wall thickness. However, inner cooling using gas, e.g. air, does have the following disadvantages. In view of the low heat conductivity of the plastic to the cooling gas, large quantities of air are needed for the cooling. Since the inner pressure of the inside of the film tubing can only be slightly above the outer atmospheric pressure, since otherwise the thin plastic film tubing would burst, large quantities of low-pressure air must be supplied and discharged. This requires again large cross-sectional intakes and outlets and a large cross-section of the connecting channels in the nozzle tip inside the ring-shaped or circular extrusion aperture. This requires nozzle tip designs with large openings for the mass current whereby the homogeneity of the plastic is destroyed and the quality of the film produced is minimized. For this reason, on the contrary, attempts have been made to use nozzle tips with smaller openings for the mass current, in accordance with which flow of the plastic in the circular channel of the nozzle is prevented as much as possible from separating into individual branchings, with these branchings being rejoined after a short distance, in order to extrude as much as possible a homgeneous film tubing with uniform wall thickness and quality with the most regular speed of flow possible. However, with the large cross-sectional channels required for the cooling air, the undesirable reacting effect of the cooling air on the nozzle tip can only be controlled to a minimal degree.

To avoid the aforementioned disadvantages, another known inner cooling method for the inside of the film tubing provides for the use of a cooling unit to be mounted onto the nozzle tip. The inflating medium, for example air, inside the film tubing is not replaced but rather is continuously rotated by a fan and thus alternately re-cooled inside the cooling unit. Cooling water, for example, can be fed through the nozzle tip into the exchanger, and then be removed. This method of inner cooling, however, has the following disadvantages. The blowing device drive is made exceptionally difficult by the fact that the section of film which has not yet been blown is very difficult to pull-up over the cooling unit which is mounted above the nozzle tip and blowing head. The electric motor of the fan also develops additional heat which must be eliminated. Humidity as well as vaporizing additives in the plastic, such as plasticizers or lubricants, can condensate on the cooling unit, thereby resulting in quality-reducing irregularities on the surface of the film, due to the condensation dripping onto the hot film and causing local chilling and the steam generated by the possible re-evaporating of the condensation. Dripping condensation on the nozzle can also cause local chilling and thus faults such as the formation of stripes on the film, and the steam generated on the hot nozzle by the evaporating condensation also leads again to defects on the surface of the film. The nozzle tip must be equipped with a cable duct for the current supply to the ventilator motor, with an intake and outlet channel for the heat exchange, and with a channel for the discharge of condensation, thus requiring again the previously mentioned nozzle tip design with undesirably large openings for the mass current. In a short time, the heat transfer is impaired by the dripping plasticizer or lubricant, and the manufacturing process must be interrupted so that the heat exchanger can be cleaned.

The hollow-body blowing process for the manufacturing of bottles, cans and the like according to a completely different technique, differs considerably from the aforementioned film-blowing methods to which the present invention relates. With such process, extruded tubular or pipe-shaped preformed objects are fed intermittently into a blow mold in which they are inflated by means of an inflating medium introduced into the inner space, after which they are cooled. The outer cooling of the hollow body which lies against the blow mold is effected by the blowing device itself which is provided with cooling channels through which a cooling medium can be fed.

With the above hollow-body blowing process, as far as is known, the inner cooling needed in order to create a greater cooling power is not accomplished using air, but rather with a non-gaseous cooling medium such as liquid carbon dioxide which is introduced inside the hollow body at a temperature well below the normal room temperature, inside which it should evaporate. In this case, the cooling medium should not be introduced inside the hollow body until after the blowing process, to prevent the walls of the hollow body from embrittling and to prevent defects on the inside of the hollow body. This sequential blowing and cooling process, however, can only be used for intermittent hollow-body blowing processes, and not for uninterrupted film-blowing processes during which a constant and simultaneous blowing and cooling of the film tubing continuously occurs. Moreover, with the existing hollow-body blowing processes mentioned herein, the carbon dioxide must be prevented from becoming more compact (i.e., resulting in carbonic ice) than carbon dioxide snow, against the inner wall of the hollow body, as this could result in material defects caused by a chilling shock, and for this reason the pressure inside the hollow body must be kept above the triple point of the carbon dioxide; in other words, a pressure above 4.2 atmospheres must be maintained at all times.

This is also possible only with the hollow-body blowing process in which the hollow body rests inside a blow mold, and not with the film-blowing process in which such a high inner pressure would lead to bursting of the thin plastic film tubing. Moreover, as far as the hollow-body blowing process discussed herein is concerned, when using the aforementioned high pressure there is no guarantee that the liquid carbon dioxide which is sprayed will instantly evaporate and that no carbon dioxide drippings will fall on the inner wall of the hollow body, thus causing material defects due to the chilling shock.

With this in mind, it has been suggested that an even more intensive cooling be achieved by using liquid nitrogen or liquid air instead of the carbon dioxide. However, this method has proved unfeasible due to the fact that material damages due to chilling shock could not be avoided.

Another suggestion for the inner cooling process which is necessary when working with the hollow-body blowing process was to spray liquified gas directly into the pre-formed products without prior expansion. It is obvious, however, that this would most definitely lead to the previously mentioned chilling shock and result in the disadvantages listed above.

In order to avoid these disadvantages, it has then been suggested that, for the inner cooling needed with the hollow-body blowing process, the liquified gas used as cooling medium be evaporated at the beginning of the inflating process by letting it flow through warm inlet pipes and a warm blowing mandrel, so that it is introduced in the pre-shaped forms in a gaseous form thus expanding said forms. In further stages of the inflating phase, i.e. following cooling of the pipes and of the blowing mandrel, the cooling medium is still only partly evaporated and finally reaches its liquid state inside the hollow body at the end of the inflating phase. This method should permit the plastic material which is still hot to only come in contact with the gaseous cooling medium, and the liquid or solid cooling medium particles to only enter the hollow body once the latter has been cooled to such a degree that there is no longer a danger that chilling shock and the accompanying material defects could result. The process whereby the liquified cooling medium is first evaporated inside the warm sections of the apparatus until these sections have cooled is also only possible in conjunction with the hollow-body process with which the previously mentioned sections of the apparatus can be warmed up between each individual blowing phase. This method, however, cannot be used in conjunction with the film-blowing procedure with which a constant inner cooling must be effected and the cooling medium must therefore be constantly supplied. For the film-blowing process to which the invention relates, it has also been suggested to use a liquified gas such as carbon dioxide or liquid nitrogen as a cooling medium, for the inner cooling, with the latter being sprayed inside the film tubing. This method, however, also has the disadvantages which were previously mentioned in relation to the existing hollow-body blowing process since mechanical damages can result on the film tubing due to the impact of liquid or solid cooling medium particles or chilling shock, and the accompanying material defects resulting in poor quality material could hardly be avoided.

SUMMARY OF THE INVENTION

An object of the invention is therefore to provide a process and device for the uninterrupted manufacture of plastic film tubing by blowing up a continuous film tubing by means of an extruder-injector, including an inner cooling of the extruded film tubing using a gaseous cooling medium mainly in its liquified condition which is introduced inside the film tubing, the cooling medium then being converted through evaporation to its vaporous or gaseous state before being purged. A further object of the invention is to provide such a process and device whereby, on the one hand, a high cooling power available with the use of a liquified cooling medium can be achieved, while eliminating the disadvantages which have been pointed out above which result from the existing processes. More particularly, the liquid or solid cooling medium particles are prevented from coming into contact with the film tubing thus avoiding mechanical or thermal material defects which would reduce the quality of the product.

In accordance with the invention, these objectives are achieved, first by the fact that the cooling medium is introduced inside the film tubing in a substantially liquified state in such a way that up to a reversing point located above the nozzle tip and blowing head of the extruder, an upward coolant stream occurs in the center of the inner space, from which stream liquid and/or solid coolant particles are carried and kept in suspension, and the coolant stream, at the reversing point thereof, fans out substantially radially, after which the cooling medium falls back down in the opposite direction to the direction of the stream, along the wall of the film tubing and finally to the coolant outlet of the blowing head. The reversing point, in this case, must be so high that the liquid and/or solid coolant particles carried by the stream can evaporate before the coolant medium reaches the area of the film tubing which lies below the frost line so that such area of the film tubing only comes in contact with a vaporous and/or gaseous falling coolant stream.

By "center" of the inner space, reference is made to the entire circular cross-section of the inner space, with the exception of its circular edge.

It has been found that with proper size, construction and installation of the outlet and outlets respectively equipped with one or more nozzles, the liquified cooling medium can be introduced in such a way into the inner space of the film tubing that it creates an upward stream in the center of the inner space, in which liquid and/or solid coolant particles are carried and held in suspension in a way similar, for example, to the known gasification of coal dust in a suspension process for coal dust carried and held in suspension by an upward stream of gaseous gasification medium until the carbon is gasified, whereby the gaseous reaction products contribute to create the suspension condition of the solid particles. The invention is based on the knowledge that, in a similar way, parts of the upward coolant stream which are being converted to their vaporous or gaseous state through heat absorption contribute to keep the still liquid or solid coolant particles in suspension in the upward coolant stream, whereby the heat input to the upward stream occurs from the outside in such a way that the still liquid or solid coolant particles are also kept in the middle or center of the inner space. Moreover, the invention is also based on the recognized fact that the upward coolant stream at its entry point in the inner space exerts an injector-type effect on the gaseous coolant stream falling along the wall of the film tubing, whereby a sufficient quantity of heated vaporous or gaseous coolant is aspirated and carried by the falling coolant stream, in order to carry and keep the liquid or solid coolant particles in suspension in the upward coolant stream and to begin conversion of part of these particles to their vaporous or gaseous state, thus creating the previously-mentioned bearing strength of the upward coolant stream. In accordance with the process of the invention, the liquid or solid coolant particles are able to be maintained in the center of the inner space so as to prevent the same from coming in contact with the film tubing. In a manner similar to the aforementioned gasification process of coal whereby the height of the suspension bed can be measured according to the necessary reaction time, the height of the upward coolant stream, in accordance with the invention, can be also determined by proper choice of size, construction and installation of the coolant nozzle. In other words, the reversing point which lies above the blowing head must be so high that the liquid or solid coolant particles can evaporate before the coolant stream which falls along the wall of the film tubing to the coolant outlet reaches the still-viscous section of the film tubing which is under the frost line, so that the latter only comes in contact with vaporous or gaseous cooling medium. Through the countercurrent direction of the coolant stream which is falling down and that of the film tubing which is being pulled-up, an additional advantage is obtained whereby the coldest part of the sinking coolant stream comes in contact with the film tubing section which is already cold, and the warmest section of the film tubing comes in contact with the cooling medium which is already warm, thus preventing sudden shock-causing chillings. Similarly to the frost line, the reversing point also forms a zone. Within this zone, the upward coolant stream fans out externally before changing into a sinking coolant stream in the opposite direction. In accordance with further refinements of the invention, the reversing point is favorably located above the frost line. This permits the upward coolant stream to immediately fan out before the cooling medium is completely evaporated. In this way it is possible, on the one hand, for the section of the film tubing which lies above the frost line and is still warm immediately following solidification, and which is no longer sensitive to any impact from liquid or solid coolant particles, to be quickly cooled back to the temperature required for insertion into the crushing cylinders and pull-up rolls. On the other hand, the cooling medium on that film tubing section is entirely evaporated before the sinking or falling coolant stream reaches the viscous section of film tubing which lies below the frost line.

Carbon dioxide is especially suitable for use as a gaseous cooling medium; however, other examples of suitable media are: liquid nitrogen, liquid air and fluorized hydrocarbon halides.

The process according to the present invention effects an additional advantage in the fact that when using carbon dioxide as a cooling medium, the inner space of the film tubing can be processed using low pressure which lies below the triple point of the cooling medium, i.e. a pressure with which the carbon dioxide is only present in its solid or gaseous form. The carbon dioxide which is introduced in its substantially liquid form is thus converted to its solid form by this pressure, and forms carbon dioxide snow which is kept in suspension by the upward coolant stream.

The process, in accordance with the invention, therefore permits the manufacture of perfect top-quality film tubing from a higher-capacity film-blowing device due to the use of a higher-power inner cooling system.

BRIEF DESCRIPTION OF THE DRAWINGS

The Figures illustrate one example of operation of one part of a film-blowing device in conjunction with the process according to the invention.

FIG. 2 is a cross-sectional view taken substantially along lines II—II of FIG. 1, and FIG. 3 is a view similar to FIG. 1 showing a part of the device as including an adjustable inlet tube.

DESCRIPTION OF THE PREFERRED EMBODIMENT

Figure 1:
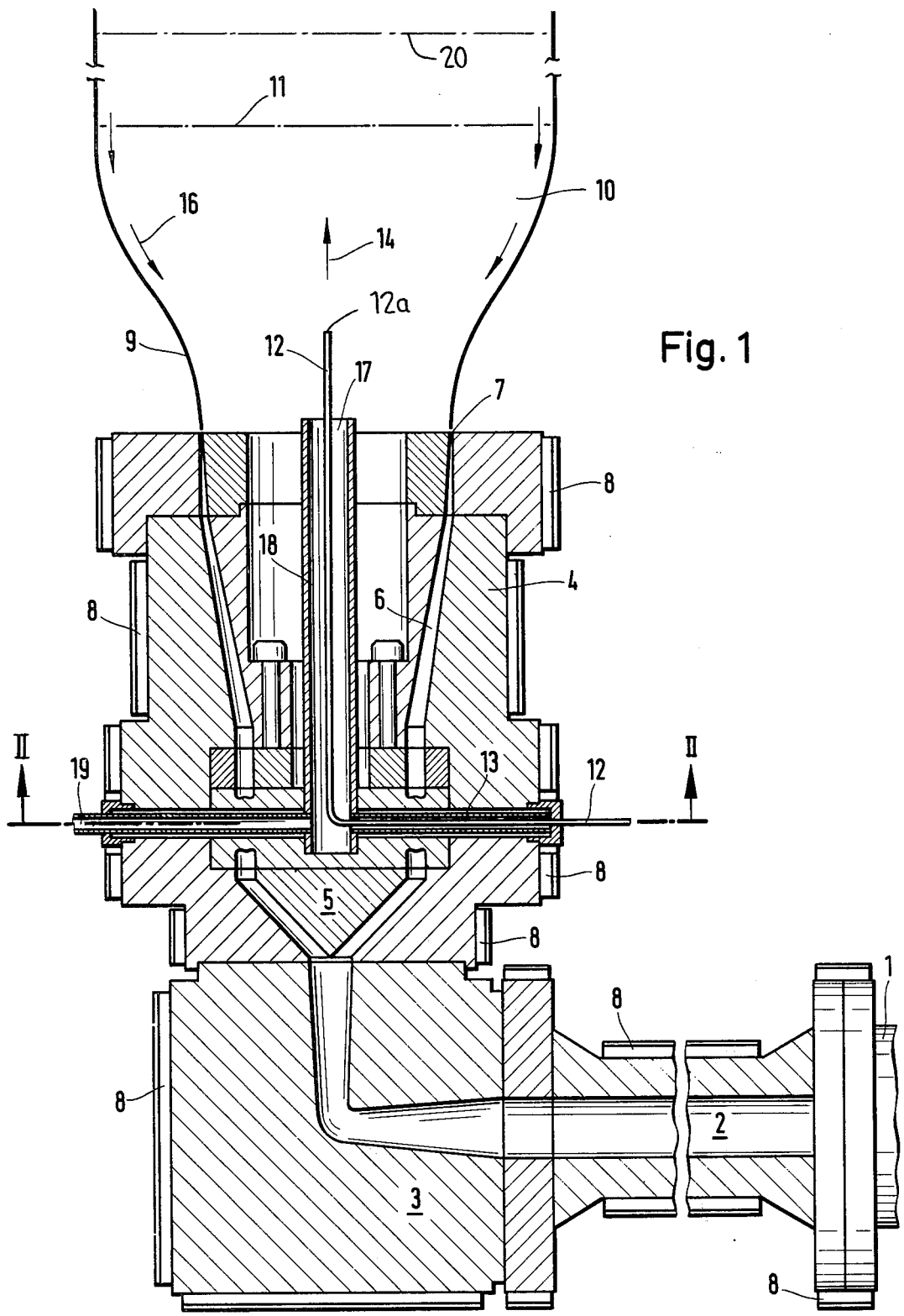
FIG. 1 is a vertical sectional view of the device.

The plasticized plastic flows from extruder 1 shown in FIG. 1 through a mass channel 2 and through a guide 3 to the nozzle tip and blowing head, the entirety of which is indicated as at 4, as having an annular distribution tip 5 which spreads the plastic onto a nozzle ring channel 6 from which a film tubing 9 is extruded from a circular extrusion aperture 7. Heating strips and heating plates 8 disposed about extruder outlet 1, as well as about mass channel 2, guide 3 and nozzle tip 4 control the necessary temperature in the device. The crushing cylinders and pull-up rolls mounted above the nozzle tip and blowing head 4 for film tubing 9 are not illustrated here in the interest of clarity. The inner space of film tubing 9 is referenced as 10, and the frost line zone of the film tubing is indicated by line 11.

An insulating tube 13 in nozzle tip 4 serves as a heat insulator for an inlet tube 12, which can be a capillary tube for example, for the introduction of a liquified cooling medium into nozzle tip 4. The supply of cooling medium is controlled and regulated by a regulator not shown in the drawing. The inlet tube 12 opens into inner space 10, above nozzle aperture 7, whereby based on proper quantity, size, design and installation of the outlet orifice or orifices, or of the nozzles, the cooling medium which is substantially liquid is introduced into inner space 10 in such a way that, in the center of inner space 10, an upward coolant stream indicated by an arrow 14 is formed, in which liquid and/or solid coolant particles are carried and held in suspension. In the zone around reversing point 20 which is located above the nozzle tip and blowing head 4, coolant stream 14 fans out substantially radially outwardly, before it changes into a vaporous and/or gaseous coolant sinking stream 16 (shown by the arrows) falling in the opposite direction along the wall of film tubing 9. The sinking coolant stream, upon reaching coolant outlet 17, flows into a rising pipe 18 and through an insulating tube 19 before being discharged by the nozzle tip and blowing head 4, whereby the gas discharged is controlled by regulators (not shown) in such a way that the desired blowing pressure is maintained by the vaporous and/or gaseous coolant which serve also as blowing medium, in inner space 10. The reversing point zone 20 is caused to be located at such a distance from the nozzle tip and blowing head that liquid and/or solid coolant particles carried by the upward coolant stream 14 evaporate before the cooling medium reaches the film tubing section which is under frost line 11, so that the latter only comes in contact with the sinking vaporous or gaseous coolant stream 16. In the form of operation which is illustrated in the drawing, the reversing point zone 20 is located above frost line 11. In order to permit the level of the reversing point to be set and adjusted, the invention provides for the level adjustment of the outlet orifice or nozzle 12a of inlet tube 12 to be adjustable. This can easily be achieved in accordance with an additional aspect of the invention wherein inlet tube 12 is mounted completely axially in a movable manner inside blowing head 4 and can be axially shifted or displaced from the outside of blowing head 4 by means of a turnscrew 21 as shown in FIG. 3. Of course, any other like means are available for axially shifting tube 12 without departing from the scope of the invention.

Obviously, many modifications and variations of the invention are made possible in the light of the above teachings. It is therefore to be understood that within the scope of the appended claims the invention may be practiced otherwise than as specifically described.

What is claimed is:

1. A process for the uninterrupted manufacture of plastic film tubing by the blowing up of a continuous film tubing formed by means of an extruder-injector having a nozzle tip and blowing head, including an inner cooling of the film tubing upon extrusion by the use of a gaseous cooling medium which is introduced in a substantially liquid form into an inner space of the film tubing where it is converted to its vaporous or gaseous state through heat absorption, before being discharged through a coolant outlet, characterized by introducing a cooling medium, selected from the group consisting of carbon dioxide, nitrogen, air and fluorized hydrocarbon halides, in its substantially liquid form inside the inner space of the film tubing in such a manner that it creates a coolant stream in a center of the inner space in one direction away from the nozzle tip and blowing head of the extruder until the stream reaches a reversing point, coolant particles in one of liquid or solid form being carried and held in suspension by said stream and the coolant stream fanning out substantially radially at the reversing point before changing into a sinking coolant stream in a falling direction opposite the one direction along the wall of the film tubing up to the coolant outlet of the blowing head; and causing the cooling medium while introducing it inside the inner space to reach the reversing point at such a distance from the nozzle tip and blowing head that the coolant particles in one of liquid or solid form can evaporate before the cooling medium reaches a section of the film tubing which lies below a frost line located within the tubing, whereby the section of the tubing only comes in contact with a sinking or falling vaporous and/or gaseous coolant stream.

2. The process according to claim 1, wherein the reversing point is located above the frost line.

3. The process according to claim 1, wherein the cooling medium comprises carbon dioxide, and wherein a degree of pressure which is below the triple point of the carbon dioxide is maintained in the inner space of the film tubing, i.e. the pressure with which the carbon dioxide is only present in one of its solid or gaseous forms.

* * * * *